United States Patent
Bergeron et al.

[11] 3,889,416
[45] June 17, 1975

[54] SEEDLING TREE GROWING APPARATUS

[76] Inventors: Duncan G. Bergeron, Rt. 2, Box 706, Beaverton, Oreg. 97005; Ray E. Leach, Rt. 2, Box 20, Aurora, Oreg. 97002

[22] Filed: Dec. 10, 1973

[21] Appl. No.: 423,386

[52] U.S. Cl. .................. 47/34.13; 211/74; 47/39
[51] Int. Cl. .................. A01g 9/02; A47b 71/00
[58] Field of Search .................. 211/71–74; 47/34, 34.13, 37, 1.2, 1.1, 38–39; 224/48 A–48 C

[56] References Cited
UNITED STATES PATENTS

| | | | |
|---|---|---|---|
| 905,238 | 12/1908 | Schaffer | 47/34 |
| 3,118,249 | 1/1964 | Bard et al. | 47/1.1 |
| 3,180,055 | 4/1965 | Ferrand | 47/37 |
| 3,542,210 | 11/1970 | Sorensen | 211/74 |
| 3,557,489 | 1/1971 | Ferrand | 47/37 |
| 3,660,933 | 5/1972 | Wong | 47/1.2 |
| 3,667,159 | 6/1972 | Todd | 47/34.13 |
| 3,800,469 | 4/1974 | Lau et al. | 47/34 |

FOREIGN PATENTS OR APPLICATIONS

| | | | |
|---|---|---|---|
| 1,414,605 | 9/1965 | France | 47/38.1 |

*Primary Examiner*—Robert E. Bagwill
*Attorney, Agent, or Firm*—Eugene D. Farley

[57] ABSTRACT

Seedling tree growing apparatus for use particularly in growing seedling reforestation trees comprises in combination a support tray and a plurality of tubes adapted to be supported vertically in the tray. The tubes are open at both ends and provided with inwardly extending longitudinal ribs which guide the roots of the seedling trees contained therein out the open, lower end of the tubes for air pruning.

4 Claims, 7 Drawing Figures

3,889,416

PATENTED JUN 17 1975        SHEET    1

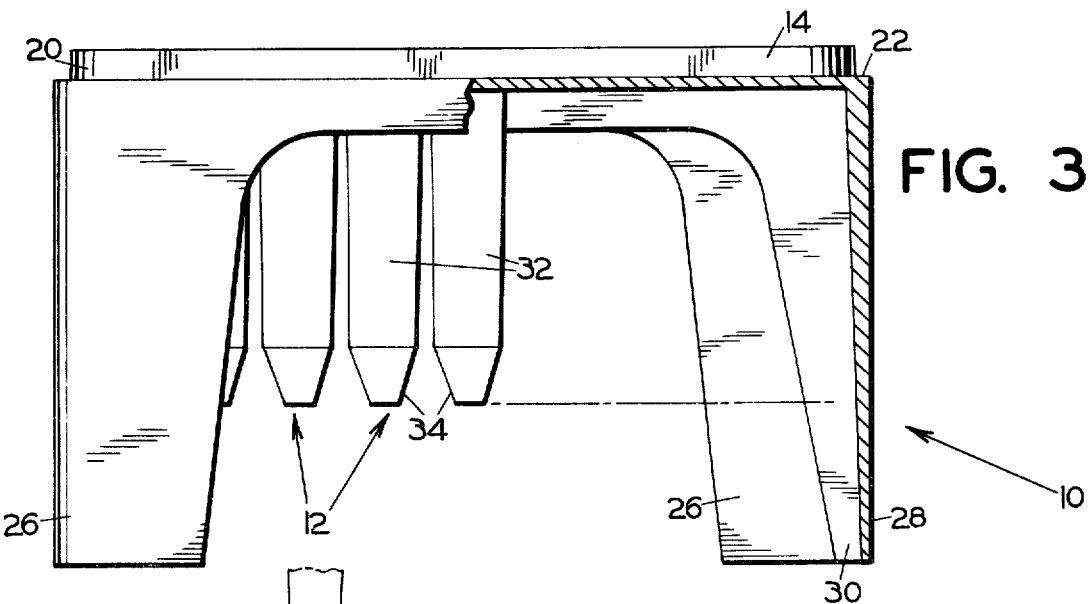
FIG. 3
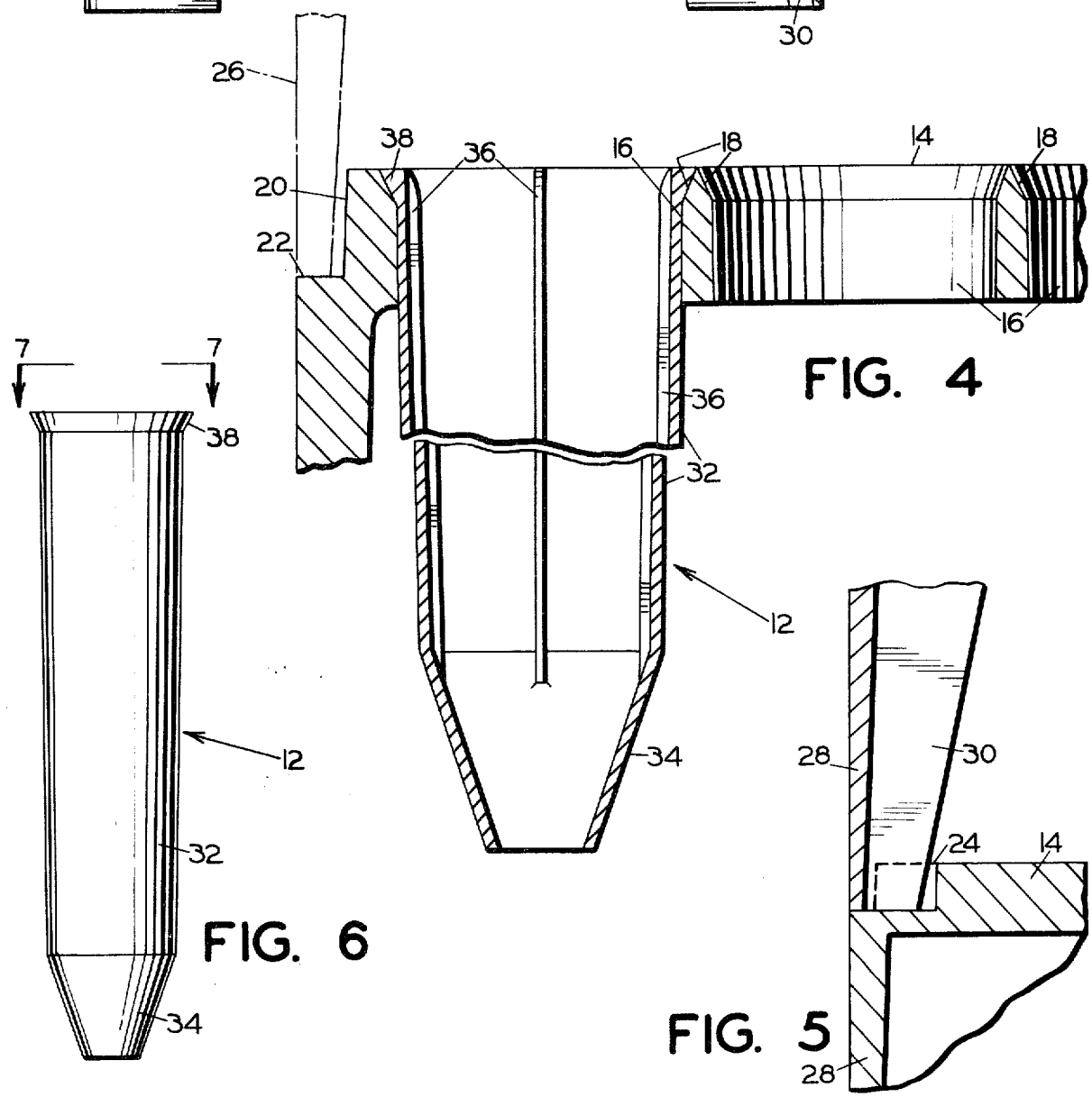
FIG. 4
FIG. 6
FIG. 5

SEEDLING TREE GROWING APPARATUS

BACKGROUND OF THE INVENTION

This invention relates to seedling tree growing apparatus. It pertains particularly to apparatus for growing on the large commercial scale seedling trees to be used in reforestation projects.

In large scale reforestation projects requiring the planting of millions of seedling trees there heretofore has been no completely satisfactory apparatus and procedure for growing the seedling trees in a condition in which they may be transferred effectively from the environment in which they are grown to the environment in which they are planted.

In accordance with a presently used technique, the tree seeds are planted in styrofoam trays containing the growth media. When the seedling trees are sufficiently developed, they are pulled out of the media in the trays and wrapped in waxed paper, with the media attached to the roots in greater or lesser degree. At the planting site, the trees are unwrapped and planted one at a time in an appropriately designed planting apparatus.

The foregoing procedure is time consuming and subject to the obvious disadvantage that at one time or another during the handling sequence, the growth media is shaken off the seedling tree roots. As a result, the procedure plants essentially bare root seedling trees and the chances of their survival are reduced correspondingly.

It is the general purpose of the present invention to provide apparatus for growing seedling trees on the large commercial scale which grows the trees effectively, guides the roots of the trees during the growing cycle, provides for air pruning of the seedling trees, and insures that the growth media will be attached to the seedling tree roots at the time when the trees are planted.

It is a further object of the present invention to provide apparatus for growing seedling trees which is adaptable to the large scale growth of such trees in reforestation projects; and which provides low cost disposable containers for the seedling trees during their growth, during their transportation to the reforestation area, and during their packing into the planting site.

THE DRAWINGS

The manner in which the foregoing and other objects of the invention are accomplished will be apparent from the accompanying specification and claims considered together with the drawings, wherein:

FIG. 3 is a view in side elevation of the apparatus looking in the direction of the arrows of line 3—3 of FIG. 1, with parts broken away to show concealed structure;

Figure 1:
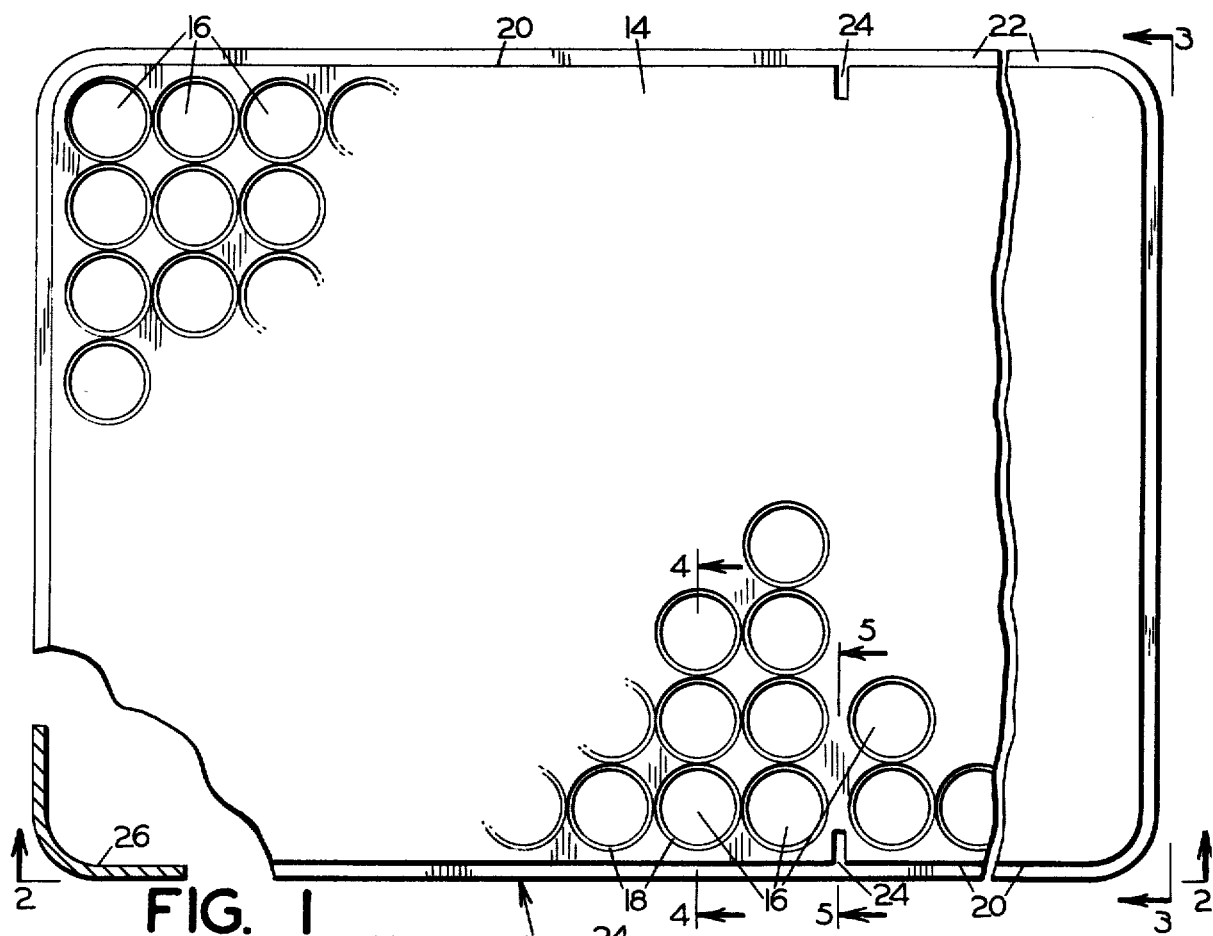
FIG. 1 is a plan view of the herein described seedling tree growing apparatus, foreshortened and partly broken away better to show concealed construction.
Figure 7:
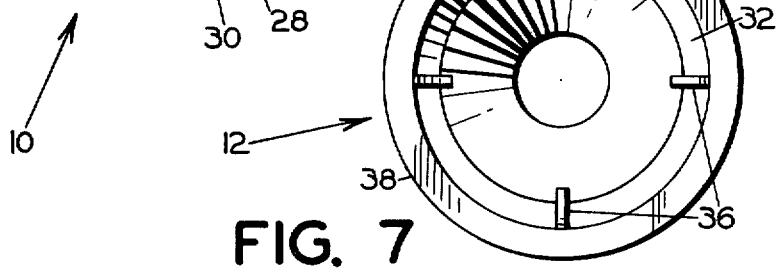

FIGS. 4 and 5 are fragmentary, enlarged, sectional views taken along lines 4—4 and 5—5, respectively, of FIG. 1;

FIG. 6 is a view of an individual cell employed to grow a single seedling tree in the apparatus of the invention, viewed in elevation; and FIG. 7 is a plan view of the cell of FIG. 6, looking in the direction of the arrows of line 7—7 of that figure.

GENERAL STATEMENT OF THE INVENTION

The seedling tree growing apparatus of our invention broadly comprises a flat, horizontally arranged support plate having a plurality of spaced openings transversely through it. A vertically arranged frame extends downwardly from the underside of the plate and supports it on an underlying surface.

A plurality of tubes or cells, open on both ends, are dimensioned and contoured to seat one in each of the openings through the plate, with the lower ends of the tubes spaced above the supporting surface a distance predetermined to afford access of air for air pruning the roots of seedling trees growing in the cells.

Each tube has a plurality of radially spaced, longitudinal inwardly directed ribs for guiding the roots as they grow. The upper surface of the support plate and the cells supported thereby are flush for easy removal of the growth media. The trays have marginal recesses and interlocking keys for stacking a large number of the trays and the tubes which they support into an integrated stack which may be palletized for easy transportation from place to place.

DETAILED DESCRIPTION OF A PREFERRED EMBODIMENT

Figure 2:
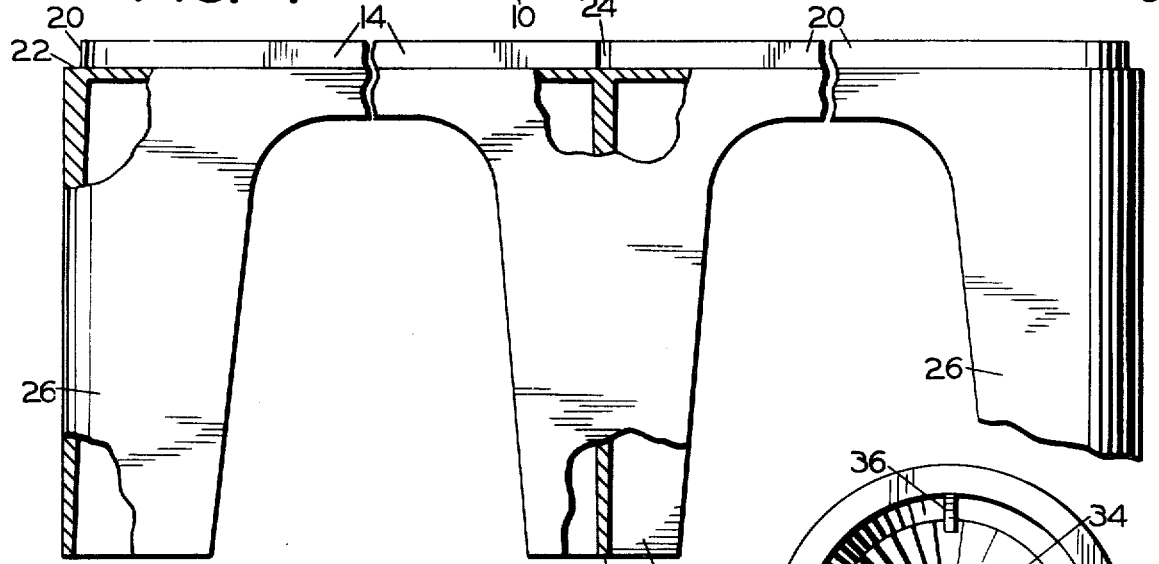
FIG. 2 is a view in end elevation of the apparatus looking in the direction of the arrows of line 2—2 of FIG. 1, with parts broken away to show concealed structure.

Referring first to FIGS. 1, 2 and 3 of the drawings:

The seedling tree growing apparatus of our invention basically comprises a tray and a plurality of tree growing cells supported on the tray. The tray is indicated generally at 10; the individual cells, at 12.

Tray 10 preferably is formed from an integral body of molded plastic. It includes a horizontal support plate 14 having therethrough a plurality of vertical openings 16. A commercial tray of the class described conveniently may have upwardly of 200 such openings and hence be adapted to the growing of 200 seedling trees at a time. The upper margins of the openings are outwardly chamfered or tapered to provide recesses 18.

The outer or peripheral margin of support plate 14 is inset to provide a peripheral recess 20, having a horizontal bearing surface 22. It is further provided with inwardly extending slots 24 which serve as interlocking keyways.

Plate 14 is supported on a frame comprising a plurality of vertically extending legs. There are four corner legs 26 and a pair of intermediate legs 28.

Corner legs 26 preferably are right angular in contour. Their lower margins are designed for reception in the corners of recesses 20, with the legs bearing on bearing surfaces 22.

Intermediate legs 28 are designed to bear against the central areas of bearing surfaces 22. Furthermore, they are provided with central, inwardly extending ribs 30. These are sized for reception in slots 24 of a stacked companion tray in key and keyway relationship. Legs 26, 28 are of sufficient length to maintain the lower ends of the multiplicity of cells 12 which they support spaced a predetermined distance above the supporting surface. This permits free circulation of air beneath the cells as required for air pruning of roots growing out of the bottom of the cells.

Referring to FIGS. 4, 6 and 7, each of cells 12 comprises a tube 32, preferably circular in cross section, of a resiliently deformable plastic such as polyethylene.

The tube may be 3 or 4 inches in length and an inch or so in diameter. It is open at both ends.

The lower end 34 of the tube is inwardly tapered to assist in retaining growth media contained in the tube and to provide proper drainage.

Extending inwardly from the interior surface of the tube are a plurality of radially spaced, integral ribs 36. Preferably there are four such ribs, equally spaced from each other. They serve the function of guiding the roots downwardly in linear relation toward the open bottom end of the tube.

At the upper end of the tube there is an outwardly extending radial flange 38. The flange preferably is outwardly tapered, having a taper which mates with the taper of surface 18 of opening 16 in the support plate. It serves as a supporting flange for supporting the cell on the plate.

OPERATION

The manner of use of the herein described seedling tree growing apparatus is as follows:

In the first instance, trays 10 are filled with growth cells 12, each supported in depending relation to the tray by means of support flanges 38. As thus supported, the upper surface of support plate 14 and the upper margins of cell support flanges 38 are completely planar and provide no projections.

The cells are filled with growth media by depositing a quantity of the media on the surface of the support plate, whereupon it fills the cells. The excess surface media then is simply brushed or wiped off the surface of the plate.

Next, growth pockets are impressed in the growth media in the cells by running a special toothed roller across the surface of the tray. The seeds then are deposited in the pockets, one seed in each.

A quantity of dressing media next is deposited across the top of the tray, whereupon it fills the pockets. The surplus dressing media is wiped off, leaving the upper surface of the tray completely clean. This is important, because if there are any deposits of growth media on the upper surfaces of the tray the roots of the seedling tree will grow into it and thence into the next cell, thereby entangling the roots of the seedling trees contained in adjacent cells.

As the seedling trees grow and develop, their roots are guided linearly along the inner walls of the cells by ribs 36. This prevents spiralling of the roots, which would make the seedling trees root bound, so that when transplanted they would not grow and develop properly.

Eventually the roots of the seedling trees reach the lower ends of the cells. Here they are automatically pruned upon contact with atmospheric air by the process of air pruning.

During their growth the seedling trees and the growth media are supported by the inwardly tapered lower surfaces of the cells in which they are contained. The tapered openings at the bottoms of the cells provide proper drainage.

When the seedling trees are to be transported, or even during their development, the trays may be stacked one upon the other by nesting them together in the manner indicated in FIG. 4. In their nested relationship, corner legs 26 are received in recesses 20 and bear against support surfaces 22. Ribs 30 of center legs 28 are received in slots 24 and thus key the superimposed trays to each other. An entire stack of trays then may be palletized for easy and economical handling. When palletized, the seedling trees are maintained separate from each other, adequately ventilated, and in a condition in which they may be watered as necessary to preserve them.

At the reforestation site, the seedling trees, still in their cells, are transferred to the packs of the planting personnel. At the planting site the trees may be lifted out of the cells individually with the growth media still intact about the roots. If there is any tendency for the roots to stick in the cells, this may be overcome by rolling or pressing the resiliently deformable plastic cells in order to compress the growth media and the roots which it contains to a compass at which it may be readily removed from each cell.

The seedling trees in prime condition thus may be planted with all of the growth media still attached to the roots. This greatly favors their growth and development. The empty cells, being of very low cost, but also of great durability, as circumstances dictate, may either be discarded or returned to the nursery for re-use.

Having thus described our invention in preferred embodiments we claim:

1. Seedling tree growing apparatus comprising, in combination:
    a. a tray comprising
        1. a horizontally arranged support plate,
        2. a plurality of spaced openings vertically through the plate, and
        3. a plurality of spaced legs extending downwardly from the underside of the plate for supporting the same on a supporting surface, and
    b. a plurality of seedling tree growth cells each comprising a tube open at both ends and arranged to removably contain a quantity of tree growth media,
    c. the tubes being removably contained one in each of the support plate openings with the bottom ends of the tubes spaced upwardly from the plane of the bottom edges of the legs, whereby the bottom open ends of the tubes are spaced above a supporting surface to afford access of air for air pruning the roots of seedling trees planted in the tubes,
    d. the support plate openings being provided with recessed margins and the upper margins of the tubes being provided with outwardly extending circumferential flanges dimensioned to seat in the recesses with the upper surfaces of the tubes and flanges being on a horizontal plane not substantially higher that the horizontal plane of the upper surface of the support plate, and each of the tubes being provided with a plurality of radially spaced, longitudinally extending interior root-guiding ribs.

2. The apparatus of claim 1 wherein the margins of the openings are outwardly tapered to provide the recesses and wherein the flanges of the tubes are tapered to match the taper of the openings.

3. The seedling tree growing apparatus of claim 1 wherein the outer margins of the support plate are peripherally recessed to provide a bearing surface dimensioned and arranged to receive and support the bottom edges of the legs of a superimposed tray in a stacked arrangement of trays.

4. The apparatus of claim 3 including locking key means on the support plate and predetermined ones of the legs for releasably interlocking the support plate of one stacked tray and the predetermined ones of the legs of a superimposed tray.

* * * * *